(12) United States Patent
Okada et al.

(10) Patent No.: US 7,528,180 B2
(45) Date of Patent: *May 5, 2009

(54) INK SET FOR USE IN INK-JET RECORDING, IMAGE FORMING PROCESS AND IMAGE RECORDING APPARATUS

(75) Inventors: Takeshi Okada, Zushi (JP); Kohei Watanabe, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 589 days.

This patent is subject to a terminal disclaimer.

(21) Appl. No.: 11/220,359

(22) Filed: Sep. 6, 2005

(65) Prior Publication Data

US 2006/0058422 A1     Mar. 16, 2006

(30) Foreign Application Priority Data

Sep. 6, 2004    (JP)   ............................ 2004-258744

(51) Int. Cl.
| | |
|---|---|
| A61K 9/16 | (2006.01) |
| B05D 1/32 | (2006.01) |
| B41J 2/01 | (2006.01) |
| B41J 2/175 | (2006.01) |
| C08J 3/00 | (2006.01) |
| C08K 3/20 | (2006.01) |
| C08L 31/00 | (2006.01) |
| C08L 33/00 | (2006.01) |
| C09D 5/02 | (2006.01) |
| C09D 11/00 | (2006.01) |
| G01D 11/00 | (2006.01) |

(52) U.S. Cl. ............................. 523/160; 347/1; 347/85; 347/100; 427/466; 106/31.13; 106/31.25; 106/31.6; 106/31.85; 106/31.89; 523/161; 524/543; 524/556; 524/906

(58) Field of Classification Search ................. 523/160, 523/161; 347/1, 85, 100; 524/543, 556, 524/906; 427/466; 106/31.13, 31.25, 31.6, 106/31.85, 31.89

See application file for complete search history.

(56) References Cited

U.S. PATENT DOCUMENTS

| | | |
|---|---|---|
| 5,085,698 A | 2/1992 | Ma et al. |
| 5,221,334 A | 6/1993 | Ma et al. |
| 5,519,085 A | 5/1996 | Ma et al. |

(Continued)

FOREIGN PATENT DOCUMENTS

JP        56-147871 A     11/1981

*Primary Examiner*—Patrick D Niland
(74) *Attorney, Agent, or Firm*—Rossi, Kimms & McDowell, LLP

(57) ABSTRACT

Disclosed herein is an ink set for use in ink-jet recording, which comprises at least 2 ink compositions the solid content concentrations of which are different by more than 2% by mass. The at least 2 ink compositions each comprise an aqueous medium, a pigment and a dispersant for dispersing the pigment. The dispersant is an amphiphilic block copolymer having an A segment that is a hydrophobic segment, a B segment that is a nonionic hydrophilic segment, and a C segment that is an ionic hydrophilic segment. The number of unit structures of the B segment of the amphiphilic block copolymer contained in each of the at least 2 ink compositions is smaller in the amphiphilic block copolymer contained in the ink composition having a relatively high solid content concentration than in the amphiphilic block copolymer contained in the ink composition having a relatively low solid content concentration.

9 Claims, 2 Drawing Sheets

U.S. PATENT DOCUMENTS

| | | |
|---|---|---|
| 6,454,844 B1 | 9/2002 | Kanaya |
| 6,455,628 B1 | 9/2002 | Ma et al. |
| 6,767,090 B2 | 7/2004 | Yatake et al. |
| 6,877,851 B2 | 4/2005 | Watanabe |
| 6,982,290 B2 | 1/2006 | Nakano |
| 7,151,156 B2 | 12/2006 | Sato et al. |
| 2004/0020406 A1* | 2/2004 | Kato .......................... 106/31.6 |
| 2004/0239738 A1* | 12/2004 | Watanabe ................... 347/100 |
| 2005/0033010 A1 | 2/2005 | Sato et al. |
| 2006/0052481 A1 | 3/2006 | Watanabe et al. |

* cited by examiner

INK SET FOR USE IN INK-JET RECORDING, IMAGE FORMING PROCESS AND IMAGE RECORDING APPARATUS

BACKGROUND OF THE INVENTION

1. Field of the Invention

The present invention relates to an ink set for use in ink-jet recording, which is suitable for use in recording of color images and for storage of recorded images, particularly, an ink set for use in high-quality gradation recording, and also relates to an ink-jet recording process and an image recording apparatus using the ink set.

2. Description of the Background Art

An ink-jet recording method is a recording method, in which ink droplets are ejected from a nozzle provided in a recording head by generating pressure owing to thermal energy, vibration by means of a piezoelectric element, or the like, and the ink droplets are fixed to a recording medium to form images, which method is excellent in stillness and can form high-resolution images at high speed without using a special fixing means. Such a recording method is also suitable for use in formation of color images from the viewpoints of structural easiness, running cost, etc., and in recent years in particular, ink-jet recording processes and apparatus for forming color images have been provided for a great number of uses such as output for personal computers, graphic printing, etc.

In the case of a recording process for forming color images among the ink-jet recording processes, it is general to use at least three primary colors of a cyan ink composition, a magenta ink composition and a yellow ink composition, and images are generally formed with 4 colors plus black in addition to these colors. For example, red is artificially represented by applying magenta and yellow to the same point or adjoiningly, and blue and green are respectively represented by magenta and cyan, and cyan and yellow likewise. Further, gradation properties may be imparted to these colors by controlling the amount of ink droplets or the number of times of the application or by using black in combination therewith.

Color images may be recently formed in some cases with 6 colors including additional 2 colors produced by thinning down the concentrations of the cyan ink composition and magenta ink composition in addition to these 4 colors. Such ink compositions used in the formation of color images are required to develop a good intermediate color when combined with a plurality of ink compositions in addition to the fact that they have good coloring ability by themselves. Further, it is proposed to use a plurality of inks, which have the same hue, but differ in density, in an ink-jet recording apparatus for recording medical images or the like of which reproduction property of half tone is required.

Ink compositions of an ink set used in such ink-jet recording processes are required to have such high performances that, for example, physical properties such as viscosity and surface tension are adequate, images high in optical density and bright or clear in color tone are provided, images excellent in fastness properties such as water fastness, abrasion resistance and light fastness are provided, storage stability is excellent, clogging at an orifice is hard to be caused, and further odor, safety and the like are good.

Since aqueous solutions of dyes are generally used as inks in these processes, in some cases, bleeding may have been caused upon overlapping colors, or a phenomenon called feathering may have appeared in directions of fibers of paper at a recorded portion on a recording medium. In order to improve these problems, it is disclosed in U.S. Pat. No. 5,085,698 to use pigment-dispersed inks.

SUMMARY OF THE INVENTION

However, the pigment-dispersed inks may have involved such a problem that ejection stability of an ink composition among ink-jet recording properties is not sufficiently achieved. More specifically, re-ejection of an ink may have been hard to be stably conducted, when the ink is ejected from a predetermined nozzle of an ink-jet recording head, the ejection of the ink from this nozzle is suspended for a certain period of time, and the ink is then ejected again from the nozzle. In order to provide images of higher quality, many improvements have been still desired under the circumstances.

The present invention has been made in view of the problems of the prior art and has as its object the provision of an ink set that uses a block copolymer, by which a pigment can be well dispersed in a solvent, can form good images and satisfies ejection stability in ink-jet ejection.

Another object of the present invention is to provide a recording process and a recording apparatus using such an ink set.

The above objects can be achieved by the present invention described below.

According to the present invention, there is thus provided an ink set for use in ink-jet recording, which comprises at least 2 ink compositions, the solid content concentrations of which are different by more than 2% by mass, wherein said at least 2 ink compositions each comprise an aqueous medium, a pigment and a dispersant for dispersing the pigment, and the dispersant is an amphiphilic block copolymer having an A segment that is a hydrophobic segment, a B segment that is a nonionic hydrophilic segment, and a C segment that is an ionic hydrophilic segment, and wherein the number of unit structures of the B segment of the amphiphilic block copolymer contained in each of said at least 2 ink compositions is smaller in the amphiphilic block copolymer contained in the ink composition having a relatively high solid content concentration than in the amphiphilic block copolymer contained in the ink composition having a relatively low solid content concentration.

According to the present invention, there is also provided an image forming process using the above-described ink set for use in ink-jet recording, comprising applying energy to the ink compositions to eject the ink compositions on a recording medium to thereby form an image.

According to the present invention, there is further provided an image recording apparatus for conducting the above-described image forming process.

The block copolymers, by which a pigment can be well dispersed in a solvent under conditions of the present invention, are used, whereby good images can be formed, and ejection stability in ink-jet ejection can be satisfied.

DETAILED DESCRIPTION OF THE PREFERRED EMBODIMENTS

Figure 1:
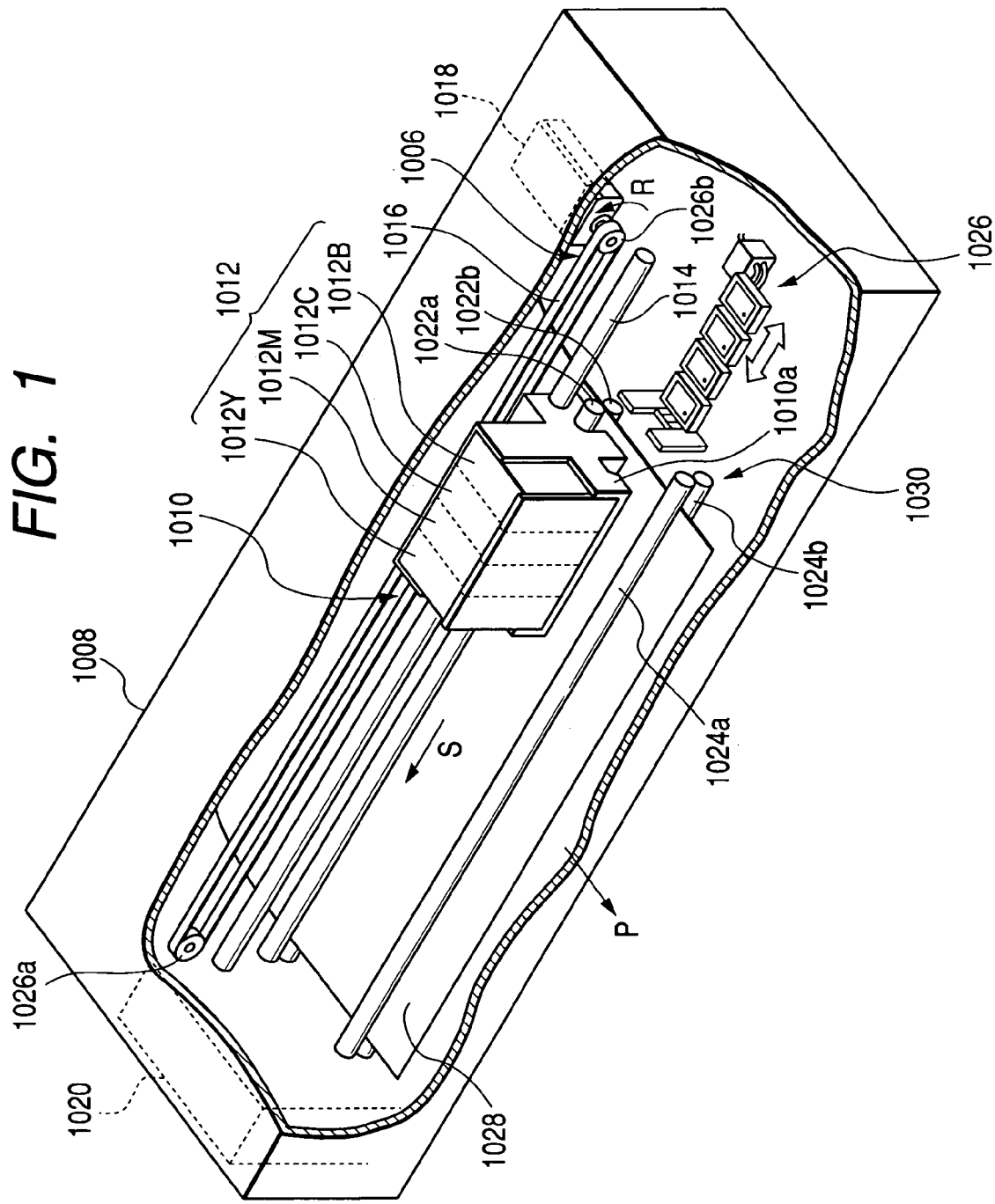
FIG. 1 is a schematic perspective view illustrating principal parts of an exemplary ink-jet printer, in which an ink-jet head can be installed.

The present invention will hereinafter be described in detail by preferred embodiments.

In the present invention, amphiphilic block copolymers of the so-called ABC structure, which characteristically have a hydrophobic segment (A segment), a nonionic hydrophilic segment (B segment) and an ionic hydrophilic segment (C segment), are used as dispersants for dispersing pigment particles. The amphiphilic property means such a nature that a polymer is soluble in 2 solvents insoluble in each other or a polymer has a site having affinity for a certain solvent and a site having no affinity for the certain solvent.

In the present invention, the amphiphilic block copolymer has the B segment, whereby the ink momentarily increases the viscosity at the same time as the penetration of water after the ink impacts on recording paper, so that such a phenomenon (color bleeding) that when at least 2 inks overlap each other, the inks mix with each other to make the boundary indefinite is reduced. In addition, the block copolymer has the B segment, whereby the pigment particles rapidly aggregate to uniformly fix without forming any coarse particles even when an organic solvent is present in excess after the impact of the ink, so that the glossiness of the resulting image is improved. The abrasion resistance and water fastness are also improved.

In the ink prepared by using such a dispersant resin, however, re-ejection of the ink may have heretofore been hard to be stably conducted when the ink is ejected from a predetermined nozzle of an ink-jet recording head, the ejection of the ink from this nozzle is suspended for a certain period of time, and the ink is then ejected again from the nozzle. Therefore, inconvenience such as formation of stripe-like unevenness is caused upon the formation of an image. The present inventors have carried out an extensive investigation. As a result, it has been found that this re-ejection property is greatly affected by 2 factors of a solid content concentration of the ink and a polymerization degree of the B segment of the dispersant resin. In other words, it is known that when no ink is ejected from the tip of an orifice of an ink-jet head for a certain period of time, water evaporates through an opening of the tip of the orifice to increase the solid content concentration to increase the viscosity of the ink, so that subsequent ejection is affected. Such influence markedly appears on an ink having a high solid content concentration by nature. However, it has been found that by decreasing polymerization degree of the B segment of the dispersant resin, the pigment particles dispersed are moved to a region containing water in a high proportion when the ratio of water and an organic solvent at the tip portion of the orifice is changed due to evaporation of water, so that the increase of viscosity by the increase of the solid content concentration is prevented to lessen the influence on the subsequent ejection.

Therefore, in the ink set comprising at least 2 ink compositions different in solid content concentration from each other, the ink composition having a relatively high solid content concentration uses, as a dispersant, an amphiphilic block copolymer having a B segment with a lower polymerization degree (the number of unit structures) than the ink composition having a relatively low solid content concentration, whereby both formation of good images high in fastness properties and good ejection stability by the ink-jet head can be achieved.

Incidentally, the solid content concentration of the ink composition in the present invention means the proportion of nonvolatile components (for example, ink and dispersant) in the ink composition to the whole mass of the ink composition. The technical problem in the present invention particularly markedly arises when the solid content concentration of the ink composition is 4% by mass or higher.

Since formation of a color image in ink-jet recording is generally conducted by at least 3 colors of a yellow ink composition, a magenta ink composition and a cyan ink composition, the amphiphilic block copolymer is suitably applied to an ink set having these 3 color ink compositions. In the ink set of these 3 colors, an optimum solid content concentration in each of the ink compositions is also preset from the viewpoint of color reproduction. In the present invention, at this time, the amphiphilic block copolymer of the dispersant is selected as described above, whereby ejection stability can be improved to form a color image free of defects.

Other ink compositions than the above-described 3 colors may also be used for the purpose of enlarging a color reproduction range and providing an image of high image quality. Specific examples of the ink compositions include color ink compositions of light magenta, light cyan, black, light black, red, green, blue, orange, violet and the like.

The light magenta and light cyan ink compositions described herein generally mean those obtained by respectively lowering the colorant concentrations of the magenta and cyan ink compositions for the purpose of improving the image quality of a printed image by density modulation. At this time, an ink set, in which for inks of the same color an ink having a high solid content concentration uses an amphiphilic block copolymer with a lower polymerization degree (the number of unit structures) of the B segment than that having a low solid content concentration to stabilize pigment particles, is used, whereby a color image good in color reproduction can be formed.

The red, orange, green, blue and violet ink compositions are ink compositions used as elements making up intermediate colors of yellow, magenta and cyan for the purpose of improving the color reproduction range. The light black ink composition is that obtained by lowering the colorant concentration of the black ink composition for the purpose of improving the color reproduction property and gradation property for a dark color of a shadow portion or the like and lowering graininess.

Incidentally, the block copolymer is a copolymer that polymer segments composed of different unit structures are bonded to each other by a covalent bond and is also called a block polymer.

Specific examples of the block copolymer used as a dispersant in the ink compositions according to the present invention include conventionally known block copolymers such as acrylic or methacrylic block copolymers, block copolymers composed of polystyrene and any other addition polymerization system or condensation polymerization system, and block copolymers having polyoxyethylene and polyoxyalkylene blocks. The block copolymer according to the present invention preferably contains a polyvinyl ether structure as a unit structure.

Preferable and specific unit structures of the ionic hydrophilic segment (C segment) include those having unit structures represented by the following general formula (1)

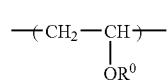

(1)

wherein $R^0$ is —X—(COOH)$_r$, —X—(COO-M)$_r$, or —X—(COO)$_2$M$^2$, X is a linear, branched or cyclic alkanediyl or alkanetriyl group having 1 to 20 carbon atoms, or —(CH(R$^5$)—CH(R$^6$)—O)$_p$—(CH$_2$)$_m$—CH$_{3-r}$—, —(CH$_2$)$_m$—(O)$_n$—(CH$_2$)$_q$—CH$_{3-r}$—, or a group obtained by substituting a carbonyl group or an aromatic ring structure for at least one of the methylene groups thereof or a group obtained by substituting an aromatic ring structure for at least one of the methine groups thereof, r is 1 or 2, p is an integer of from 1 to 18, m is an integer of from 0 to 35, n is 1 or 0, q is an integer of from 0 to 17, M is a monovalent cation, M$^2$ is a divalent cation, and R$^5$ and R$^6$ are alkyl groups and may be the same or different from each other wherein the R$^5$ or R$^6$ groups may be the same or different from each other when a plurality of such groups are present.

Further, preferable and specific unit structures of the hydrophobic segment (A segment) or nonionic hydrophilic segment (B segment) include unit structures represented by the following general formula (2)

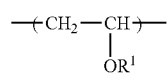

(2)

wherein R$^1$ is selected from a linear, branched or cyclic alkyl group having 1 to 18 carbon atoms, -Ph, -Pyr, -Ph-Ph, -Ph-Pyr, —(CH(R$^5$)—CH(R$^5$)—O)$_p$—R$^7$ and —(CH$_2$)$_m$—(O)$_n$—R$^7$, in which hydrogen bonded to carbon in the aromatic ring may be replaced by a linear or branched alkyl group having 1 to 4 carbon atoms and carbon in the aromatic ring may be replaced by nitrogen, p is an integer of from 1 to 18, m is an integer of from 1 to 36, n is 1 or 0, R$^5$ and R$^6$ are, independently of each other, hydrogen or —CH$_3$ wherein R$^5$ and R$^6$ may be the same or different from each other when a plurality of such groups are present, and R$^7$ is selected from hydrogen, a linear, branched or cyclic alkyl group having 1 to 18 carbon atoms, -Ph, -Pyr, -Ph-Ph, -Ph-Pyr, —CHO, —CH$_2$CHO, —CO—CH=CH$_2$ and —CO—C(CH$_3$)=CH$_2$, with the proviso that hydrogen bonded to carbon in R$^7$ may be replaced by a linear or branched alkyl group having 1 to 4 carbon atoms, —F, —Cl or —Br, and carbon in the aromatic ring may be replaced by nitrogen, when R$^7$ is any other group than hydrogen, Ph denotes a phenyl or phenylene group, and Pyr denotes a pyridyl group.

Specific examples of the preferable unit structures making up the C segment and represented by the general formula (1) are mentioned below.

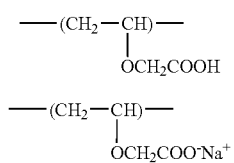

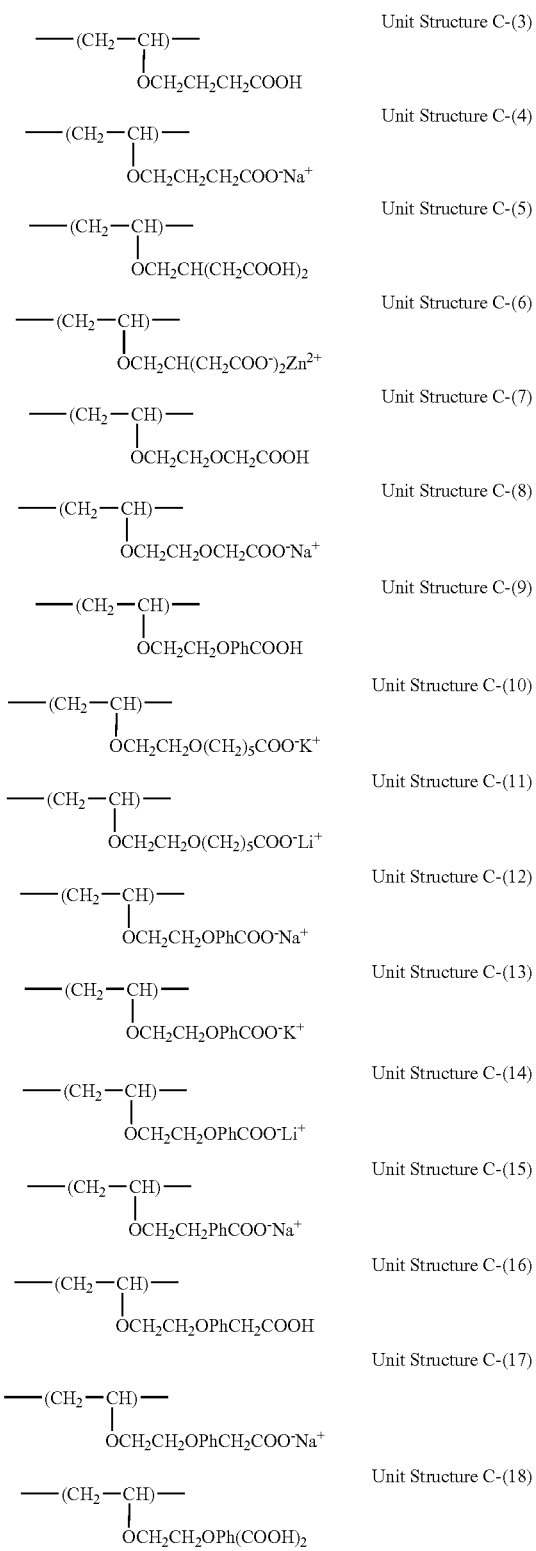

wherein Ph denotes a substituted benzene ring.

Specific examples of the preferable unit structures making up the A segment and represented by the general formula (2) include those mentioned below.

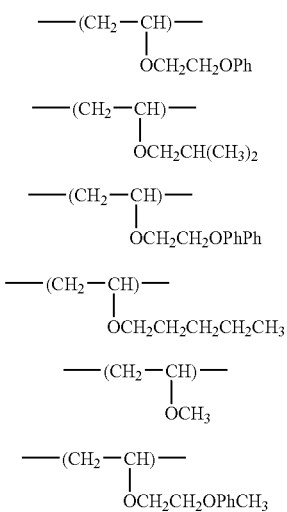

|  | Unit Structure A-(1) |
|---|---|
| —(CH$_2$—CH)— | |
|         OCH$_2$CH$_2$OPh | |
| —(CH$_2$—CH)— | Unit Structure A-(2) |
|         OCH$_2$CH(CH$_3$)$_2$ | |
| —(CH$_2$—CH)— | Unit Structure A-(3) |
|         OCH$_2$CH$_2$OPhPh | |
| —(CH$_2$—CH)— | Unit Structure A-(4) |
|         OCH$_2$CH$_2$CH$_2$CH$_2$CH$_3$ | |
| —(CH$_2$—CH)— | Unit Structure A-(5) |
|         OCH$_3$ | |
| —(CH$_2$—CH)— | Unit Structure A-(6) |
|         OCH$_2$CH$_2$OPhCH$_3$ | | wherein Ph denotes a phenyl or phenylene group.

Specific examples of the preferable unit structures making up the B segment and represented by the general formula (2) include those mentioned below.

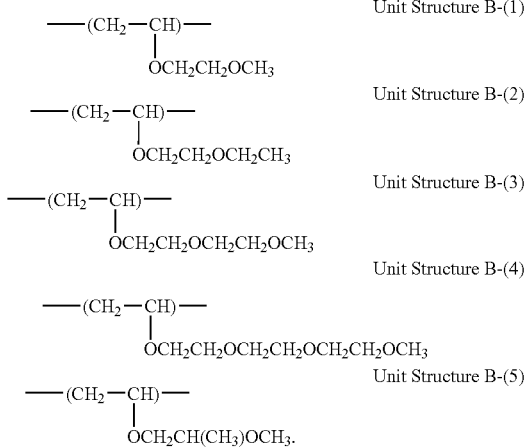

|  | Unit Structure B-(1) |
|---|---|
| —(CH$_2$—CH)— | |
|         OCH$_2$CH$_2$OCH$_3$ | |
| —(CH$_2$—CH)— | Unit Structure B-(2) |
|         OCH$_2$CH$_2$OCH$_2$CH$_3$ | |
| —(CH$_2$—CH)— | Unit Structure B-(3) |
|         OCH$_2$CH$_2$OCH$_2$CH$_2$OCH$_3$ | |
| —(CH$_2$—CH)— | Unit Structure B-(4) |
|         OCH$_2$CH$_2$OCH$_2$CH$_2$OCH$_2$CH$_2$OCH$_3$ | |
| —(CH$_2$—CH)— | Unit Structure B-(5) |
|         OCH$_2$CH(CH$_3$)OCH$_3$. | |

The respective segments of the block copolymer used in the present invention may be composed of a single unit structure or plural unit structures. Examples of a segment composed of plural unit structures include random copolymers and graduation copolymers that a compositional ratio is gradually changed.

Many synthesizing processes for a polymer containing a polyvinyl ether structure have been reported (for example, Japanese Patent Application Laid-Open No. 11-080221). Processes according to cationic living polymerization by Aoshima, et al. (Japanese Patent Application Laid-Open Nos. 11-322942 and 11-322866) are representative thereof. By conducting polymer synthesis according to the cationic living polymerization, various polymers such as homopolymers, copolymers composed of two or more monomers, block polymers, graft polymers and graduation polymers can be synthesized with their chain lengths (molecular weights) made exactly uniform. Various functional groups may be introduced into side chains of polyvinyl ether. Besides, the living polymerization may also be conducted in an HI/I$_2$ system, HCl/SnCl$_4$ system or the like.

As described above, the amphiphilic block copolymer used in the present invention has an A segment that is a hydrophobic segment, a B segment that is an oxyethylene-structure-containing nonionic hydrophilic segment, and a C segment that is an ionic hydrophilic segment. The proportion of the A segment in the amphiphilic block copolymer is preferably 30 to 80 mol % based on the whole mass of the block copolymer, the proportion of the B segment is preferably 5 to 70 mol %, more preferably 5 to 40 mol %, and a proportion of the C segment is preferably 5 to 30 mol %.

Polymerization degrees of the respective segments in the present invention are, independently of one another, preferably from 3 to 10,000, more preferably from 5 to 5,000. Further, the polymerization degree of the A segment is preferably from 30 to 120, the polymerization degree of the B segment is preferably from 5 to 160, and the polymerization degree of the C segment is preferably from 5 to 20.

The number of unit structures of the B segment of the amphiphilic block copolymer contained in the ink composition having a relatively low solid content concentration is preferably 1.1 times or more, particularly preferably 1.5 times or more as much as the number of unit structures of the B segment of the amphiphilic block copolymer contained in the ink composition having a relatively high solid content concentration, and preferably 5 times or less, particularly preferably 3 times or less.

In the present invention, any combination of the ink compositions making up the ink set requires that the number of unit structures of the B segment of the amphiphilic block copolymer contained in the ink composition relatively low in solid content concentration is greater than the number of unit structures of the B segment of the amphiphilic block copolymer contained in the ink composition relatively high in solid content concentration so far as a difference between their solid content concentrations exceeds 2% by mass. In the present invention, the number of the unit structures of the B segment more preferably satisfies the constitution of the present invention even when the difference between the solid content concentrations is at most 2% by mass.

In the present invention, the content of the unit structures contained in the block copolymer and represented by the general formula (1) or (2) is within a range of preferably from 0.01 to 99 mol %, particularly preferably from 1 to 90 mol % based on the whole of the block copolymer. If the content is lower than 0.01 mol %, the interaction of the resulting polymer to be operated by the functional groups that the respective segments have may become insufficient in some cases. If the content exceeds 99 mol %, the interaction may overact on the contrary, and the function may become insufficient in some cases.

The number average molecular weight (Mn) of the block copolymer used in the present invention is within a range of preferably from 200 to 10,000,000, particularly preferably from 1,000 to 1,000,000. If the molecular weight exceeds 10,000,000, entanglement within a polymer chain and between polymer chains becomes too much, and so such a copolymer may be hard to be dispersed in a solvent. If the molecular weight is lower than 200, the molecular weight may be too low to exhibit a steric effect as a polymer.

In order to improve the dispersion stability of a pigment, the molecular motion of the block copolymer is preferably more flexible because such a block copolymer becomes easy to physically entangle with a surface of a functional substance and have affinity for it. Therefore, the glass transition temperature Tg of the block copolymer is preferably 20° C. or lower, more preferably 0° C. or lower, still more preferably −20° C. or lower. In this regard, a block copolymer having a polyvinyl ether structure is preferably used because it generally has a low glass transition point and flexible properties. In the case of the examples of the unit structures mentioned above, their glass transition temperatures may be often about −20° C. or lower.

The block copolymers as the dispersants contained in the ink compositions according to the present invention may be used either singly or in any combination thereof. Further, publicly known dispersants may also be used in combination. The content of the dispersant contained in the ink composition according to the present invention is preferably 0.1 to 30% by mass, more preferably 0.5 to 10% by mass, still more preferably 0.5 to 6% by mass based on the whole mass of the ink composition. If the content of the dispersant is higher than this range, it may be difficult in some cases to retain the desired ink viscosity. If the content of the dispersant is lower than this range, it may be difficult in some cases to realize the desired dispersibility. The ratio of the pigment to the block copolymer as the dispersant (pigment/block copolymer) is preferably 0.05 to 5, more preferably 1 to 3 by mass.

The aqueous medium contained in the ink compositions according to the present invention is a mixed solvent of water, a buffer and a water-soluble organic solvent. The water and water contained in the buffer may be tap water containing various ions, but ion-exchanged water (deionized water) is preferably used.

No particular limitation is imposed on the water-soluble organic solvent so far as it is soluble in water. However, examples of water-soluble organic solvents preferably used include polyhydric alcohols such as ethylene glycol, diethylene glycol, triethylene glycol, polyethylene glycol, polypropylene glycol, propylene glycol, butylene glycol, 1,2,6-hexanetriol, thiodiglycol, hexylene glycol, glycerol, trimethylolethane and trimethylolpropane. Besides, alkyl ethers of polyhydric alcohols, such as ethylene glycol monoethyl ether, ethylene glycol monobutyl ether, diethylene glycol monomethyl ether, diethylene glycol monoethyl ether, triethylene glycol monomethyl ether and triethylene glycol monoethyl ether, urea, 2-pyrrolidone, N-methyl-2-pyrrolidone, 1,3-dimethyl-2-imidazolidinone, triethanolamine, etc. may be mentioned. These solvents may be used either singly or in any combination thereof. The content of the water-soluble organic solvent in the aqueous medium is preferably 3 to 60% by mass based on the whole mass of the ink composition.

As the buffer, an amine, an inorganic salt, ammonia, phosphoric acid or the like is preferably used to adjust the pH of the ink composition so as to stabilize it within an ink tank or a pipe in a recording apparatus.

The content of the aqueous medium contained in the ink compositions according to the present invention is preferably within a range of from 30% by mass to 95% by mass based on the whole mass of the ink composition.

The pigments used in the ink compositions according to the present invention may be either organic-pigments or inorganic pigments. As pigments used in the ink compositions, may preferably be used black pigments and pigments of three primary colors of cyan, magenta and yellow. Incidentally, other color pigments than those described above, colorless or light-colored pigments and metalescent pigments may also be used. In the present invention, commercially available pigments or newly synthesized pigments may also be used. These pigments may be used in combination with dyes.

Examples of commercially available pigments in black, cyan, magenta and yellow are mentioned below.

As examples of black pigments, may be mentioned Raven 1060, Raven 1080, Raven 1170, Raven 1200, Raven 1250, Raven 1255, Raven 1500, Raven 2000, Raven 3500, Raven 5250, Raven 5750, Raven 7000, Raven 5000 ULTRA II and Raven 1190 ULTRA II (all, trade names of products of Columbian Carbon Co.), Black Pearls L, MOGUL-L, Regal 400R, Regal 660R, Regal 330R, Monarch 800, Monarch 880, Monarch 900, Monarch 1000, Monarch 1300 and Monarch 1400 (all, trade names of products of Cabot Company), Color Black FW1, Color Black FW2, Color Black FW200, Color Black 18, Color Black S160, Color Black S170, Special Black 4, Special Black 4A, Special Black 6, Printex 35, Printex U, Printex 140U, Printex V and Printex 140V (all, trade names of products of Degussa AG), and No. 25, No. 33, No. 40, No. 47, No. 52, No. 900, No. 2300, MCF-88, MA600, MA7, MA8 and MA100 (all, trade names of products of Mitsubishi Chemical Corporation). However, the present invention is not limited thereto.

As examples of cyan pigments, may be mentioned C.I. Pigment Blue 1, C.I. Pigment Blue 2, C.I. Pigment Blue 3, C.I. Pigment Blue 15, C.I. Pigment Blue 15:2, C.I. Pigment Blue 15:3, C.I. Pigment Blue 15:4, C.I. Pigment Blue 16, C.I. Pigment Blue 22 and C.I. Pigment Blue 60. However, the present invention is not limited thereto.

As examples of magenta pigments, may be mentioned C.I. Pigment Red 5, C.I. Pigment Red 7, C.I. Pigment Red 12, C.I. Pigment Red 48, C.I. Pigment Red 48:1, C.I. Pigment Red 57, C.I. Pigment Red 112, C.I. Pigment Red 122, C.I. Pigment Red 123, C.I. Pigment Red 146, C.I. Pigment Red 168, C.I. Pigment Red 184, C.I. Pigment Red 202 and C.I. Pigment Red 207. However, the present invention is not limited thereto.

As examples of yellow pigments, may be mentioned C.I. Pigment Yellow 12, C.I. Pigment Yellow 13, C.I. Pigment Yellow 14, C.I. Pigment Yellow 16, C.I. Pigment Yellow 17, C.I. Pigment Yellow 74, C.I. Pigment Yellow 83, C.I. Pigment Yellow 93, C.I. Pigment Yellow 95, C.I. Pigment Yellow 97, C.I. Pigment Yellow 98, C.I. Pigment Yellow 114, C.I. Pigment Yellow 128, C.I. Pigment Yellow 129, C.I. Pigment Yellow 151 and C.I. Pigment Yellow 154. However, the present invention is not limited thereto.

Pigments, which can be self-dispersed in water, may also be used in the ink compositions according to the present invention. The pigments, which can be self-dispersed in water, include those utilizing a steric hindrance effect that a polymer is caused to be adsorbed on the surface of a pigment, and those utilizing electrostatic repulsion force. Examples of commercially available products thereof include CAB-O-JET 200 and CAB-O-JET 300 (both, trade names of products of Cabot Company), and Microjet Black CW-1 (trade name of product of Orient Chemical Industries Ltd.).

The content of the pigments used in the present invention is preferably from 0.1 to 50% by mass based on the whole mass of the ink composition. If the content is lower than 0.1% by mass, a sufficient image density may not be achieved in some cases. If the content exceeds 50% by mass, the pigment may aggregate in some cases to fail to be dispersed. A more preferable range of the content is from 0.5% by mass to 30% by mass, with 0.5 to 10% by mass being particularly preferred.

The average particle size of the pigment contained in the ink composition according to the present invention is preferably within a range of from 50 to 200 nm. In order to provide images having better image quality, the average particle size is preferably 100 nm or less.

The particle size of the pigment was measured by means of FPAR-1000 (trade name; manufactured by Otsuka Electronics Co., Ltd.).

The image forming process and image recording apparatus according to the present invention will hereinafter be described.

FIG. 1 is a schematic perspective view illustrating principal parts of a liquid-ejecting head as an ink-jet head of an ejection system that a bubble is linked to the air at the time of ejection, and an exemplary ink-jet printer as an ink-jet image recording apparatus using this head.

In FIG. 1, the ink-jet printer comprises a conveying device 1030 for intermittently conveying paper 1028 as a recording medium provided along a longitudinal direction in a casing 1008 in a direction shown by an arrow P in FIG. 1, a recording part 1010 to be reciprocated in a substantially parallel direction along a guide rod 1014 in a direction of an arrow S substantially perpendicular to the conveying direction P of the paper 1028 by the conveying device 1030, and a moving and driving part 1006 as a driving means for reciprocating the recording part 1010.

The conveying device 1030 comprises a pair of roller units 1022a and 1022b and a pair of roller units 1024a and 1024b arranged in substantial parallel with and in opposed relation to each other, and a driving part 1020 for driving these respective roller units. By this construction, the paper 1028 is intermittently conveyed while being held between the respective roller units 1022a and 1022b and the roller units 1024a and 1024b in a direction shown by the arrow P when the driving part 1020 of the conveying device 1030 is operated. The moving and driving part 1006 comprises a belt 1016 wound around pulleys 1026a and 1026b respectively provided on rotating shafts oppositely arranged at a prescribed interval, and a motor 1018 for driving in forward and reverse directions the belt 1016 joined to a carriage member 1010a of the recording part 1010 arranged in substantial parallel to the roller units 1022a and 1022b.

When the motor 1018 is operated to rotate the belt 1016 in a direction shown by an arrow R in FIG. 1, the carriage member 1010a of the recording part 1010 is moved by the prescribed movement in the direction shown by the arrow S in FIG. 1. When the motor 1018 is operated to rotate the belt 1016 in a direction reverse to the direction shown by the arrow R in FIG. 1, the carriage member 1010a of the recording part 1010 is moved by the prescribed movement in a direction reverse to the direction shown by the arrow S in FIG. 1. At an end of the moving and driving part 1006, a recovery unit 1026 for conducting an ejection-recovery operation for the recording part 1010 is provided in opposed relation to an array of ink-ejection openings of the recording part 1010 at the home position of the carriage member 1010a.

In the recording part 1010, ink-jet cartridges (hereinafter may be referred to merely as "cartridges" in some cases) 1012Y, 1012M, 1012C and 1012B for respective colors, for example, yellow, magenta, cyan and black, are detachably mounted on a carriage member 1010a. The effect brought about by satisfying the conditions of the ink compositions according to the present invention is not limited to a particular color. For example, it is a preferred embodiment that at least two inks selected from the above-described yellow, magenta, cyan and black inks satisfy the conditions of the ink compositions according to the present invention. Further, it is also a preferred embodiment that each of 2 inks, which give images of the same hue and are different in tinting strength, i.e., deep and light shade inks, satisfies the conditions of the ink compositions according to the present invention.

Incidentally, with respect to the definitions of the deep and light shade inks, images of the same hue as obtained when the deep and light shade inks give the images of the same hue mean that when respective images of 360 dpi (dot per inch)× 720 dpi formed on plain paper with the deep and light shade inks by means of an ink-jet head, the ejection quantity of which is about 20 to 50 pl (picoliters) are visually observed, and the hues thereof are classified into 10 categories (R, YR, Y, GY, G, BG, B, PB, P and RP) of Munsell symbols based on the Munsell color chip, the respective images belongs in the same category or adjoining categories. The ink having high tinting strength specifically means an ink the content of pigments in which is relatively high.

In such a case as described above, the inks of a set of inks different in color or a set of deep and light shade inks according to the present invention may be contained in separate cartridges as shown in FIG. 1. Alternatively, an ink cartridge equipped with an ink containing portion containing the respective inks and formed detachably in an ink-jet head may also be provided. An example where an ink cartridge and an ink-jet head are integrally formed may be mentioned as another embodiment.

Figure 2:
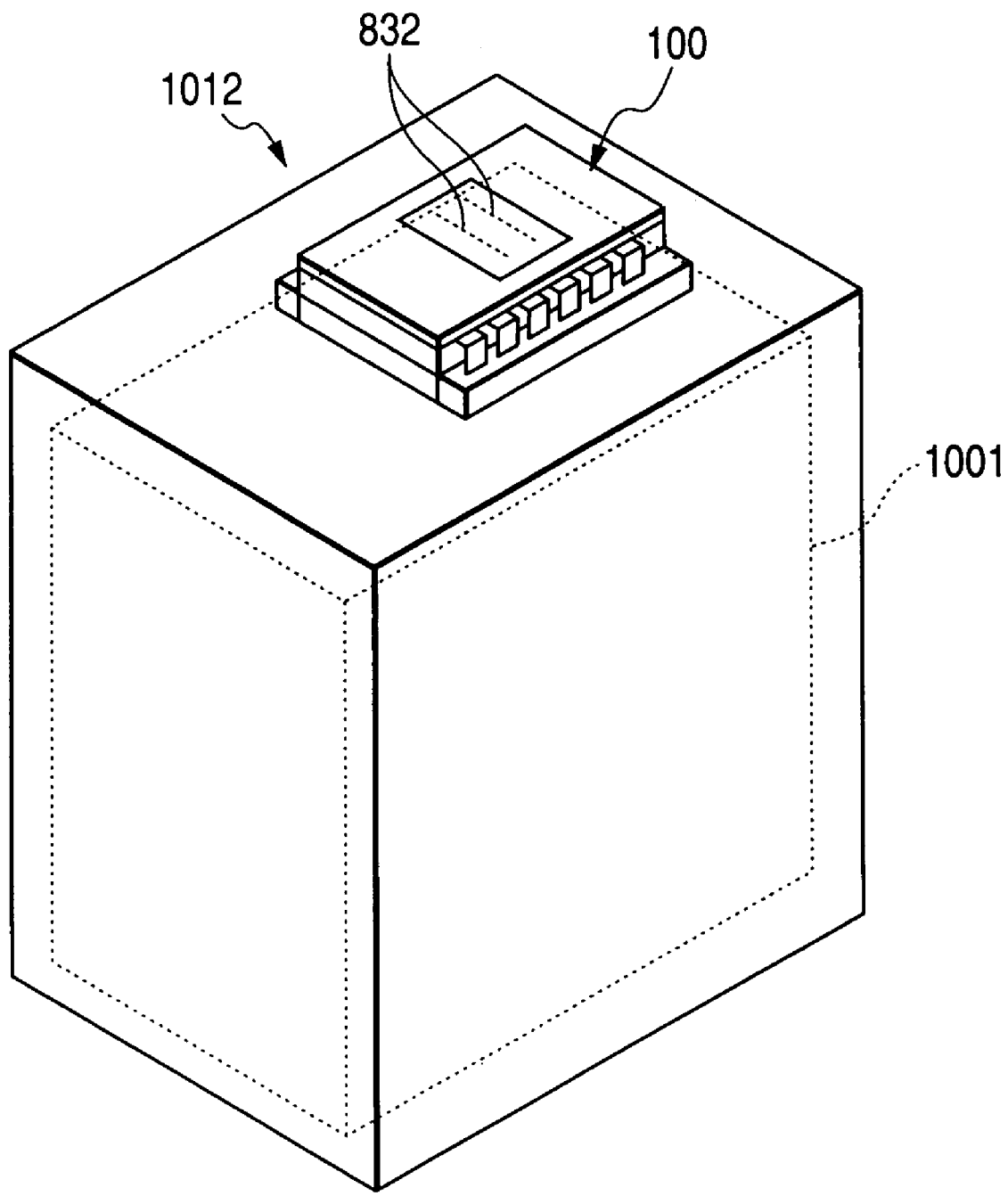
FIG. 2 is a schematic perspective view illustrating an exemplary ink-jet cartridge equipped with an ink-jet head.

FIG. 2 illustrates an exemplary ink-jet cartridge capable of being mounted on the above-described ink-jet recording apparatus. The cartridge 1012 shown in FIG. 2 is of a serial type, and its principal part is constructed by an ink-jet head 100 and a liquid tank 1001 for containing a liquid such as an ink.

In the ink-jet head 100, a great number of ejection openings 832 for ejecting the liquid are formed, and the liquid such as an ink is directed to a common liquid chamber (not illustrated) in the liquid-ejecting head 100 through a liquid feed passage (not illustrated) from the liquid tank 1001. The cartridge 1012 shown in FIG. 2 is so constructed that the ink-jet head 100 and the liquid tank 1001 are integrally formed, and the liquid can be supplied to the interior of the liquid tank 1001 as needed. However, such a structure that the liquid tank 1001 is replaceably joined to this liquid-ejecting head 100 may also be used.

The present invention will hereinafter be described in detail by the following examples. However, the present invention is not limited to these examples.

(Synthesis of Block Copolymer)

Unit Structure A-(2), a random copolymer of Unit Structure A-(2) and Unit Structure A-(3) (copolymerization unit ratio: 45/46), or Unit Structure A-(6) was used as a hydrophobic segment (A), Unit Structure B-(3) was used as a nonionic hydrophilic segment (B), and Unit Structure C-(9) was used as an ionic hydrophilic segment (C) to synthesize triblock copolymers of 8 kinds in total by living cationic polymerization using an aluminum catalyst.

Specifically, after the interior of a glass container equipped with a three-way stop-cock was purged with nitrogen, the container was heated to 250° C. under a nitrogen gas atmosphere to remove adsorbed water. After the system was returned to room temperature, a monomer, which will become unit structure(s) of the A segment, was added to 16 mmol of ethyl acetate, 0.05 mmol of 1-isobutoxyethyl acetate and 11 ml of toluene, and then the reaction system was cooled. At the time the temperature within the system had reached 0° C., 0.2 mmol of ethylaluminum sesquichloride (equimolar mixture of diethylaluminum chloride and ethylaluminum dichloride) was added to initiate polymerization. The molecular weight was periodically monitored by means of gel permeation chromatography (GPC) to confirm completion of the polymerization of the monomer to become the unit structure(s) of the A segment.

A monomer, which will become unit structure(s) of the B segment, was then added to continue the polymerization.

Completion of the polymerization of the monomer to become the unit structure(s) of the B segment was confirmed by monitoring by means of GPC. Thereafter, a toluene solution of a monomer, which will become unit structure(s) in which a carboxylic acid moiety in unit structures of the C segment has been esterified, was added to continue the polymerization. After 20 hours, the polymerization reaction was terminated. The termination of the polymerization reaction was conducted by adding a 0.3% by mass aqueous solution of ammonia/methanol into the system. The reaction mixture solution was diluted with dichloromethane and washed 3 times with 0.6 M hydrochloric acid and then 3 times with distilled water. The resultant organic phase was concentrated and dried to solids by an evaporator and then vacuum-dried. The resultant product was dialyzed repeatedly in a methanol solvent using a semi-permeable membrane composed of cellulose to remove monomeric compounds, thereby obtaining the intended triblock polymer. The identification of the compound was conducted by means of NMR and GPC.

The block polymer obtained above was hydrolyzed in a mixed solution of dimethylformamide and aqueous sodium hydroxide, thereby hydrolyzing the ester moiety of the C segment to obtain a triblock polymer in a form of a sodium salt. The identification of the compound was conducted by means of NMR and GPC.

This polymer was further neutralized with 0.1N hydrochloric acid in an aqueous dispersion to obtain a triblock polymer, in which the sodium salt portion in the C segment turned into a free carboxylic acid. The identification of the compound was conducted by means of NMR and GPC. The data of the numbers of unit structures of the respective segments, number average molecular weights Mn and molecular weight distributions Mw/Mn of the block copolymer prepared above are shown in Table 1. Mn and Mw/Mn of a styrene-acrylic acid random copolymer (RP1; copolymerization unit ratio: 1/1) used as a reference are also shown collectively in Table 1.

TABLE 1

| Block Copolymer | A segment Unit structure | No. | B segment Unit structure | No. | C segment Unit structure | No. | Mn | Mw/Mn |
|---|---|---|---|---|---|---|---|---|
| BP1 | A-(2) | 110 | B-(3) | 42 | C-(9) | 16 | 19700 | 1.24 |
| BP2 | A-(2) and A-(3) | 100 | B-(3) | 45 | C-(9) | 17 | 21700 | 1.23 |
| BP3 | A-(6) | 99 | B-(3) | 43 | C-(9) | 17 | 21200 | 1.21 |
| BP4 | A-(6) | 99 | B-(3) | 65 | C-(9) | 17 | 25000 | 1.28 |
| BP5 | A-(6) | 98 | B-(3) | 50 | C-(9) | 15 | 23400 | 1.26 |
| BP6 | A-(6) | 98 | B-(3) | 30 | C-(9) | 15 | 20400 | 1.20 |
| BP7 | A-(6) | 98 | B-(3) | 90 | C-(9) | 14 | 21200 | 1.36 |
| BP8 | A-(6) | 98 | B-(3) | 130 | C-(9) | 14 | 31200 | 1.36 |
| RP1 | Styrene-acrylic acid random copolymer | | | | | | 22000 | 1.98 |

(Preparation of Ink Compositions and Production of Ink Set)

The copolymers shown in Table 1 were used as dispersant resins, a pigment was dissolved in dimethylformamide, and the resultant solution was converted into a water phase with ion-exchanged water to obtain a pigment dispersion. To this dispersion were added glycerol, diethylene glycol, trimethylolpropane and Acetylenol EH (trade name, product of Kawaken Fine Chemicals Co., Ltd.), thereby preparing ink compositions of the compositions shown in Tables 2 to 9 to produce Ink Sets 1 to 8 of the combinations shown in Tables 2 to 9. Among these ink sets, Ink Sets 1 to 3 are ink sets according to EXAMPLES 1 to 3 of the present invention, which were made up with the ink compositions of 4 colors of black, magenta, cyan and yellow, and Ink Sets 4 and 5 are those corresponding to COMPARATIVE EXAMPLES 1 and 2 of the present invention. Ink Sets 6 and 7 are ink sets according to EXAMPLES 4 and 5 of the present invention, which were made up with the ink compositions of 6 colors including light magenta and light cyan in addition to the above-described 4 colors, and Ink Sets 8 and 9 are those corresponding to COMPARATIVE EXAMPLES 3 and 4 of the present invention.

TABLE 2

| EXAMPLE 1 Ink Set 1 | | Black ink comp. | Magenta ink comp. | Cyan ink comp. | Yellow ink comp. |
|---|---|---|---|---|---|
| Pigment | Black pigment (carbon black) | 3.5% by mass | | | |
| | Magenta pigment (C.I. Pigment Red 122) | | 3.5% by mass | | |
| | Cyan pigment (C.I. Pigment Blue 15:3) | | | 2.5% by mass | |
| | Magenta pigment (C.I. Pigment Yellow 128) | | | | 4.5% by mass |
| Kind of dispersant resin | | BP5 | BP5 | BP4 | BP2 |
| Dispersant resin | | 3.5% by mass | 3.5% by mass | 2.5% by mass | 4.5% by mass |
| Solid content concentration | | 7.0% by mass | 7.0% by mass | 5.0% by mass | 9.0% by mass |
| Glycerol | | 7.0% by mass | 7.0% by mass | 7.0% by mass | 7.0% by mass |
| Diethylene glycol | | 5.0% by mass | 5.0% by mass | 5.0% by mass | 5.0% by mass |
| Trimethylolpropane | | 7.0% by mass | 7.0% by mass | 7.0% by mass | 7.0% by mass |

TABLE 2-continued

| EXAMPLE 1 Ink Set 1 | Black ink comp. | Magenta ink comp. | Cyan ink comp. | Yellow ink comp. |
|---|---|---|---|---|
| Acetylenol EH | 1.0% by mass | 1.0% by mass | 1.0% by mass | 1.0% by mass |
| Ion-exchanged water | Balance | Balance | Balance | Balance |
| The number of B segments | 50 | 50 | 65 | 45 |

TABLE 3

| EXAMPLE 2 Ink Set 2 | | Black ink comp. | Magenta ink comp. | Cyan ink comp. | Yellow ink comp. |
|---|---|---|---|---|---|
| Pigment | Black pigment (carbon black) | 3.5% by mass | | | |
| | Magenta pigment (C.I. Pigment Red 122) | | 3.5% by mass | | |
| | Cyan pigment (C.I. Pigment Blue 15:3) | | | 2.5% by mass | |
| | Magenta pigment (C.I. Pigment Yellow 128) | | | | 4.5% by mass |
| Kind of dispersant resin | | BP2 | BP1 | BP7 | BP6 |
| Dispersant resin | | 3.5% by mass | 3.5% by mass | 2.5% by mass | 4.5% by mass |
| Solid content concentration | | 7.0% by mass | 7.0% by mass | 5.0% by mass | 9.0% by mass |
| Glycerol | | 7.0% by mass | 7.0% by mass | 7.0% by mass | 7.0% by mass |
| Diethylene glycol | | 5.0% by mass | 5.0% by mass | 5.0% by mass | 5.0% by mass |
| Trimethylolpropane | | 7.0% by mass | 7.0% by mass | 7.0% by mass | 7.0% by mass |
| Acetylenol EH | | 1.0% by mass | 1.0% by mass | 1.0% by mass | 1.0% by mass |
| Ion-exchanged water | | Balance | Balance | Balance | Balance |
| The number of B segments | | 45 | 42 | 90 | 30 |

TABLE 4

| EXAMPLE 3 Ink Set 3 | | Black ink comp. | Magenta ink comp. | Cyan ink comp. | Yellow ink comp. |
|---|---|---|---|---|---|
| Pigment | Black pigment (carbon black) | 3.5% by mass | | | |
| | Magenta pigment (C.I. Pigment Red 122) | | 3.5% by mass | | |
| | Cyan pigment (C.I. Pigment Blue 15:3) | | | 2.5% by mass | |
| | Magenta pigment (C.I. Pigment Yellow 128) | | | | 4.5% by mass |
| Kind of dispersant resin | | BP4 | BP4 | BP7 | BP1 |
| Dispersant resin | | 3.5% by mass | 3.5% by mass | 2.5% by mass | 4.5% by mass |
| Solid content concentration | | 7.0% by mass | 7.0% by mass | 5.0% by mass | 9.0% by mass |
| Glycerol | | 7.0% by mass | 7.0% by mass | 7.0% by mass | 7.0% by mass |
| Diethylene glycol | | 5.0% by mass | 5.0% by mass | 5.0% by mass | 5.0% by mass |
| Trimethylolpropane | | 7.0% by mass | 7.0% by mass | 7.0% by mass | 7.0% by mass |
| Acetylenol EH | | 1.0% by mass | 1.0% by mass | 1.0% by mass | 1.0% by mass |
| Ion-exchanged water | | Balance | Balance | Balance | Balance |
| The number of B segments | | 65 | 65 | 90 | 42 |

TABLE 5

| COMPARATIVE EXAMPLE 1 Ink Set 4 | | Black ink comp. | Magenta ink comp. | Cyan ink comp. | Yellow ink comp. |
|---|---|---|---|---|---|
| Pigment | Black pigment (carbon black) | 3.5% by mass | | | |
| | Magenta pigment (C.I. Pigment Red 122) | | 3.5% by mass | | |
| | Cyan pigment (C.I. Pigment Blue 15:3) | | | 2.5% by mass | |
| | Magenta pigment (C.I. Pigment Yellow 128) | | | | 4.5% by mass |
| Kind of dispersant resin | | BP8 | BP8 | BP8 | BP8 |
| Dispersant resin | | 3.5% by mass | 3.5% by mass | 2.5% by mass | 4.5% by mass |
| solid content concentration | | 7.0% by mass | 7.0% by mass | 5.0% by mass | 9.0% by mass |
| Glycerol | | 7.0% by mass | 7.0% by mass | 7.0% by mass | 7.0% by mass |
| Diethylene glycol | | 5.0% by mass | 5.0% by mass | 5.0% by mass | 5.0% by mass |
| Trimethylolpropane | | 7.0% by mass | 7.0% by mass | 7.0% by mass | 7.0% by mass |
| Acetylenol EH | | 1.0% by mass | 1.0% by mass | 1.0% by mass | 1.0% by mass |
| Ion-exchanged water | | Balance | Balance | Balance | Balance |
| The number of B segments | | 130 | 130 | 130 | 130 |

TABLE 6

| COMPARATIVE EXAMPLE 2 Ink Set 5 | | Black ink comp. | Magenta ink comp. | Cyan ink comp. | Yellow ink comp. |
|---|---|---|---|---|---|
| Pigment | Black pigment (carbon black) | 3.5% by mass | | | |
| | Magenta pigment (C.I. Pigment Red 122) | | 3.5% by mass | | |
| | Cyan pigment (C.I. Pigment Blue 15:3) | | | 2.5% by mass | |
| | Magenta pigment (C.I. Pigment Yellow 128) | | | | 4.5% by mass |
| Kind of dispersant resin | | RP1 | RP1 | RP1 | RP1 |
| Dispersant resin | | 3.5% by mass | 3.5% by mass | 2.5% by mass | 4.5% by mass |
| Solid content concentration | | 7.0% by mass | 7.0% by mass | 5.0% by mass | 9.0% by mass |
| Glycerol | | 7.0% by mass | 7.0% by mass | 7.0% by mass | 7.0% by mass |
| Diethylene glycol | | 5.0% by mass | 5.0% by mass | 5.0% by mass | 5.0% by mass |
| Trimethylolpropane | | 7.0% by mass | 7.0% by mass | 7.0% by mass | 7.0% by mass |
| Acetylenol EH | | 1.0% by mass | 1.0% by mass | 1.0% by mass | 1.0% by mass |
| Ion-exchanged water | | Balance | Balance | Balance | Balance |
| The number of B segments | | — | — | — | — |

TABLE 7

| EXAMPLE 4 Ink Set 6 | | Black ink comp. | Magenta ink comp. | Right magenta ink comp. | Cyan ink comp. | Right cyan ink comp. | Yellow ink comp. |
|---|---|---|---|---|---|---|---|
| Pigment | Black pigment (carbon black) | 3.5% by mass | | | | | |
| | Magenta pigment (C.I. Pigment Red 122) | | 3.5% by mass | 0.7% by mass | | | |
| | Cyan pigment (C.I. Pigment Blue 15:3) | | | | 2.5% by mass | 0.5% by mass | |
| | Magenta pigment (C.I. Pigment Yellow 128) | | | | | | 4.5% by mass |
| Kind of dispersant resin | | BP1 | BP3 | BP4 | BP5 | BP7 | BP6 |
| Dispersant resin | | 3.5% by mass | 3.5% by mass | 0.7% by mass | 2.5% by mass | 0.5% by mass | 4.5% by mass |
| Solid content concentration | | 7.0% by mass | 7.0% by mass | 1.4% by mass | 5.0% by mass | 1.0% by mass | 9.0% by mass |
| Glycerol | | 7.0% by mass | 7.0% by mass | 7.0% by mass | 7.0% by mass | 7.0% by mass | 7.0% by mass |
| Diethylene glycol | | 5.0% by mass | 5.0% by mass | 5.0% by mass | 5.0% by mass | 5.0% by mass | 5.0% by mass |
| Trimethylolpropane | | 7.0% by mass | 7.0% by mass | 7.0% by mass | 7.0% by mass | 7.0% by mass | 7.0% by mass |
| Acetylenol EH | | 1.0% by mass | 1.0% by mass | 1.0% by mass | 1.0% by mass | 1.0% by mass | 1.0% by mass |
| Ion-exchanged water | | Balance | Balance | Balance | Balance | Balance | Balance |
| The number of B segments | | 42 | 43 | 65 | 50 | 90 | 30 |

TABLE 8

| EXAMPLE 5 Ink Set 7 | | Black ink comp. | Magenta ink comp. | Right magenta ink comp. | Cyan ink comp. | Right cyan ink comp. | Yellow ink comp. |
|---|---|---|---|---|---|---|---|
| Pigment | Black pigment (carbon black) | 3.5% by mass | | | | | |
| | Magenta pigment (C.I. Pigment Red 122) | | 3.5% by mass | 0.7% by mass | | | |
| | Cyan pigment (C.I. Pigment Blue 15:3) | | | | 2.5% by mass | 0.5% by mass | |
| | Magenta pigment (C.I. Pigment Yellow 128) | | | | | | 4.5% by mass |
| Kind of dispersant resin | | BP5 | BP5 | BP7 | BP4 | BP8 | BP3 |
| Dispersant resin | | 3.5% by mass | 3.5% by mass | 0.7% by mass | 2.5% by mass | 0.5% by mass | 4.5% by mass |
| Solid content concentration | | 7.0% by mass | 7.0% by mass | 1.4% by mass | 5.0% by mass | 1.0% by mass | 9.0% by mass |
| Glycerol | | 7.0% by mass | 7.0% by mass | 7.0% by mass | 7.0% by mass | 7.0% by mass | 7.0% by mass |
| Diethylene glycol | | 5.0% by mass | 5.0% by mass | 5.0% by mass | 5.0% by mass | 5.0% by mass | 5.0% by mass |
| Trimethylolpropane | | 7.0% by mass | 7.0% by mass | 7.0% by mass | 7.0% by mass | 7.0% by mass | 7.0% by mass |
| Acetylenol EH | | 1.0% by mass | 1.0% by mass | 1.0% by mass | 1.0% by mass | 1.0% by mass | 1.0% by mass |
| Ion-exchanged water | | Balance | Balance | Balance | Balance | Balance | Balance |
| The number of B segments | | 50 | 50 | 90 | 65 | 130 | 43 |

TABLE 9

| COMPARATIVE Example 3 Ink Set 8 | | Black ink comp. | Magenta ink comp. | Right magenta ink comp. | Cyan ink comp. | Right cyan ink comp. | Yellow ink comp. |
|---|---|---|---|---|---|---|---|
| Pigment | Black pigment (carbon black) | 3.5% by mass | | | | | |
| | Magenta pigment (C.I. Pigment Red 122) | | 3.5% by mass | 0.7% by mass | | | |
| | Cyan pigment (C.I. Pigment Blue 15:3) | | | | 2.5% by mass | 0.5% by mass | |
| | Magenta pigment (C.I. Pigment Yellow 128) | | | | | | 4.5% by mass |
| Kind of dispersant resin | | BP7 | BP7 | BP7 | BP7 | BP7 | BP7 |
| Dispersant resin | | 3.5% by mass | 3.5% by mass | 0.7% by mass | 2.5% by mass | 0.5% by mass | 4.5% by mass |
| Solid content concentration | | 7.0% by mass | 7.0% by mass | 1.4% by mass | 5.0% by mass | 1.0% by mass | 9.0% by mass |
| Glycerol | | 7.0% by mass | 7.0% by mass | 7.0% by mass | 7.0% by mass | 7.0% by mass | 7.0% by mass |
| Diethylene glycol | | 5.0% by mass | 5.0% by mass | 5.0% by mass | 5.0% by mass | 5.0% by mass | 5.0% by mass |
| Trimethylolpropane | | 7.0% by mass | 7.0% by mass | 7.0% by mass | 7.0% by mass | 7.0% by mass | 7.0% by mass |
| Acetylenol EH | | 1.0% by mass | 1.0% by mass | 1.0% by mass | 1.0% by mass | 1.0% by mass | 1.0% by mass |
| Ion-exchanged water | | Balance | Balance | Balance | Balance | Balance | Balance |
| The number of B segments | | 90 | 90 | 90 | 90 | 90 | 90 |

TABLE 10

| COMPARATIVE EXPAMPLE 4 Ink Set 9 | | Black ink comp. | Magenta ink comp. | Cyan ink comp. | Yellow ink comp. |
|---|---|---|---|---|---|
| Pigment | Black pigment (carbon black) | 3.5% by mass | | | |
| | Magenta pigment (C.I. Pigment Red 122) | | 3.5% by mass | | |
| | Cyan pigment (C.I. Pigment Blue 15:3) | | | 2.5% by mass | |
| | Magenta pigment (C.I. Pigment Yellow 128) | | | | 4.5% by mass |
| Kind of dispersant resin | | BP7 | BP7 | BP2 | BP4 |
| Dispersant resin | | 3.5% by mass | 3.5% by mass | 2.5% by mass | 4.5% by mass |
| Solid content concentration | | 7.0% by mass | 7.0% by mass | 5.0% by mass | 9.0% by mass |
| Glycerol | | 7.0% by mass | 7.0% by mass | 7.0% by mass | 7.0% by mass |
| Diethylene glycol | | 5.0% by mass | 5.0% by mass | 5.0% by mass | 5.0% by mass |
| Trimethylolpropane | | 7.0% by mass | 7.0% by mass | 7.0% by mass | 7.0% by mass |
| Acetylenol EH | | 1.0% by mass | 1.0% by mass | 1.0% by mass | 1.0% by mass |
| Ion-exchanged water | | Balance | Balance | Balance | Balance |
| The number of B segments | | 90 | 90 | 45 | 65 |

(Evaluation of Image)

With respect to all the ink sets produced above, evaluation as to color unevenness, abrasion resistance, water fastness and glossiness was conducted in the following manner. The evaluation was conducted on images obtained by installing each ink set in an ink-jet printer, BJF 930 (trade name, manufactured by Canon Inc.) and conducting printing on Professional Photo Paper, PR-101 (trade name; product of Canon Inc.) under predetermined conditions.

[Evaluation as to Color Unevenness]

The respective inks of black, cyan, magenta, yellow, light magenta (only Examples 4 and 5 and Comparative Example 3) and light cyan (only Examples 4 and 5 and Comparative Example 3) were used to print solid patches (5×5 cm) of 100% duty, respectively, thereby visually observing whether color unevenness occurred or not.

Rank A: No color unevenness was observed.
Rank B: Some color unevenness occurred.
Rank C: Color unevenness markedly occurred.

In the printed samples of Ranks B and C, stripe-like color unevenness occurred on the side of the beginning of the printing. The results are shown in Table 11.

TABLE 11

| | Ink Set | Black | Magenta | Light magenta | Cyan | Light cyan | Yellow |
|---|---|---|---|---|---|---|---|
| Ex. 1 | 1 | A | A | — | A | — | A |
| Ex. 2 | 2 | A | A | — | A | — | A |
| Ex. 3 | 3 | A | A | — | A | — | A |
| Comp. Ex. 1 | 4 | A | B | — | A | — | C |
| Comp. Ex. 2 | 5 | B | C | — | B | — | C |
| Ex. 4 | 6 | A | A | A | A | A | A |
| Ex. 5 | 7 | A | A | A | A | A | A |
| Comp. Ex. 3 | 8 | B | B | A | B | A | C |
| Comp. Ex. 4 | 9 | B | B | — | A | — | C |

[Evaluation as to Abrasion Resistance]

Solid printing was conducted in the same manner as in the evaluation as to the color unevenness, and the resultant images were rubbed with a finger right after completion of the printing to make evaluation as to abrasion resistance. Each sample was ranked as "A" where the images of all the colors were not messed up when rubbed with the finger or "C" where the image of at least one color was messed up when rubbed with the finger. The results are shown in Table 12.

[Evaluation as to Water Fastness]

Solid printing was conducted in the same manner as in the evaluation as to the color unevenness, and water was dropped on the resultant samples right after completion of the printing to make evaluation as to water fastness. Each sample was ranked as "A" where the images of all the colors were not blurred, or "C" where the image of at least one color was blurred. The results are shown in Table 12.

[Evaluation as to Glossiness]

Photo-images for evaluation of glossiness were printed by 4 passes, and the 20°-gloss of the resultant images was measured by means of a specular gloss meter (manufactured by Murakami Color Research Laboratory Co. Ltd.) to determine the glossiness in accordance with the following standard. The results are shown in Table 12.

AA: Not lower than 50;
A: Not lower than 40, but lower than 50;
B: Not lower than 30, but lower than 40;
C: Lower than 30.

TABLE 12

| Ink Set | Abrasion resistance | Water fastness | Glossiness |
|---|---|---|---|
| Ex. 1 | 1 | A | A | A |
| Ex. 2 | 2 | A | A | A |
| Ex. 3 | 3 | A | A | A |
| Comp. Ex. 1 | 4 | A | A | C |
| Comp. Ex. 2 | 5 | C | C | B |
| Ex. 4 | 6 | A | A | AA |
| Ex. 5 | 7 | A | A | AA |
| Comp. Ex. 3 | 8 | A | A | A |
| Comp. Ex. 4 | 9 | A | A | B |

This application claims priority from Japanese Patent Application No. 2004-258744 filed on Sep. 6, 2004, which is hereby incorporated by reference herein.

What is claimed is:

1. An ink set for use in ink-jet recording comprising at least 2 ink compositions having solid content concentrations which are different by more than 2% by mass,
wherein said at least 2 ink compositions each comprise an aqueous medium, a pigment and a dispersant for dispersing the pigment, and the dispersant is an amphiphilic block copolymer having an A segment that is a hydrophobic segment, a B segment that is a nonionic hydrophilic segment, and a C segment that is an ionic hydrophilic segment, and
wherein the number of unit structures of the B segment of the amphiphilic block copolymer contained in each of said at least 2 ink compositions is smaller in the amphiphilic block copolymer contained in the ink composition having a relatively high solid content concentration than in the amphiphilic block copolymer contained in the ink composition having a relatively low solid content concentration.

2. The ink set according to claim 1, wherein said at least 2 ink compositions are ink compositions of the same color.

3. The ink set according to claim 1, which comprises a cyan ink composition, a magenta ink composition and a yellow ink composition.

4. The ink set according to claim 1, wherein the amphiphilic block copolymer has a polyvinyl ether structure as a unit structure.

5. The ink set according to claim 4, wherein the C segment has a unit structure represented by the following general formula (1):

wherein $R^0$ is —X—(COOH)$_r$, —X—(COO-M)$_r$ or —X—(COO)$_2$M$^2$, X is a linear, branched or cyclic alkanediyl or alkanetriyl group having 1 to 20 carbon atoms, or —(CH(R$^5$)—CH(R$^6$)—O)$_p$—(CH$_2$)$_m$—CH$_{3-r}$—, —(CH$_2$)$_m$—(O)$_n$—(CH$_2$)$_q$—CH$_{3-r}$—, or a group obtained by substituting a carbonyl group or an aromatic ring structure for at least one of the methylene groups thereof or a group obtained by substituting an aromatic ring structure for at least one of the methine groups thereof, r is 1 or 2, p is an integer of from 1 to 18, m is an integer of from 0 to 35, n is 1 or 0, q is an integer of from 0 to 17, M is a monovalent cation, M$^2$ is a divalent cation, and $R^5$ and $R^6$ are alkyl groups and may be the same or different from each other wherein the $R^5$ or $R^6$ groups may be the same or different from each other when a plurality of such groups are present.

6. The ink set according to claim 4, wherein at least one of the A segment or B segment has a unit structure represented by the following general formula (2):

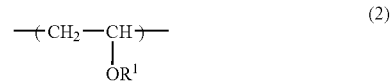

wherein $R^1$ is selected from a linear, branched or cyclic alkyl group having 1 to 18 carbon atoms, -Ph, -Pyr, -Ph-Ph, -Ph-Pyr, —(CH(R$^5$)—CH(R$^5$)—O)$_p$—R$^7$ and —(CH$_2$)$_m$—(O)$_n$—R$^7$, in which hydrogen bonded to carbon in the aromatic ring may be replaced by a linear or branched alkyl group having 1 to 4 carbon atoms and carbon in the aromatic ring may be replaced by nitrogen, p is an integer of from 1 to 18, m is an integer of from 1 to 36, n is 1 or 0, R$^5$ and R$^6$ are, independently of each other, hydrogen or —CH$_3$ wherein R$^5$ and R$^6$ may be the same or different from each other when a plurality of such groups are present, and R$^7$ is selected from hydrogen, a linear, branched or cyclic alkyl group having 1 to 18 carbon atoms, -Ph, -Pyr, -Ph-Ph, -Ph-Pyr, —CHO, —CH$_2$CHO, —CO—CH=CH$_2$ and —CO—C(CH$_3$)=CH$_2$, with the proviso that hydrogen bonded to carbon in R$^7$ may be replaced by a linear or branched alkyl group having 1 to 4 carbon atoms, —F, —Cl or —Br, and carbon in the aromatic ring may be replaced by nitrogen, when R$^7$ is any other group than hydrogen, Ph denotes a phenyl or phenylene group, and Pyr denotes a pyridyl group.

7. The ink set according to claim 1, which comprises a polyhydric alcohol as a water-soluble organic solvent contained in the aqueous medium.

8. An image forming process comprising the steps of:
providing an ink set comprising at least 2 ink compositions having solid content concentrations which are different by more than 2% by mass,
wherein said at least 2 ink compositions each comprise an aqueous medium, a pigment and a dispersant for dispersing the pigment, and the dispersant is an amphiphilic block copolymer having an A segment that is a hydrophobic segment, a B segment that is a nonionic hydrophilic segment, and a C segment that is an ionic hydrophilic segment, and wherein the number of unit structures of the B segment of the amphiphilic block copolymer contained in each of said at least 2 ink compositions is smaller in the amphiphilic block copolymer contained in the ink composition having a relatively high solid content concentration than in the amphiphilic block copolymer contained in the ink composition having a relatively low solid content concentration; and applying energy to the ink compositions of the ink set to eject the ink compositions on a recording medium to thereby form an image.

9. An image recording apparatus comprising:

an ink set: and a device for applying energy to ink compositions of the ink set to eject the ink compositions on a recording medium to thereby form an image, wherein the ink set comprises at least 2 ink compositions having solid content concentrations which are different by more than 2% by mass, wherein said at least 2 ink compositions each comprise an aqueous medium, a pigment and a dispersant for dispersing the pigment, and the dispersant is an amphiphilic block copolymer having an A segment that is a hydrophobic segment, a B segment that is a nonionic hydrophilic segment, and a C segment that is an ionic hydrophilic segment, and wherein the number of unit structures of the B segment of the amphiphilic block copolymer contained in each of said at least 2 ink compositions is smaller in the amphiphilic block copolymer contained in the ink composition having a relatively high solid content concentration than in the amphiphilic block copolymer contained in the ink composition having a relatively low solid content concentration.

* * * * *